United States Patent [19]

Hudson

[11] Patent Number: 5,282,528
[45] Date of Patent: Feb. 1, 1994

[54] BELT TRANSFER SECTION AND METHOD OF USE FOR RIGHT ANGLE BLANK FEEDER

[75] Inventor: Don Hudson, West Monroe, La.

[73] Assignee: Riverwood International Corporation, Atlanta, Ga.

[21] Appl. No.: 981,629

[22] Filed: Nov. 25, 1992

[51] Int. Cl.⁵ .................................... B65G 47/26
[52] U.S. Cl. ............................. 198/451; 198/604; 271/184; 271/225
[58] Field of Search .......... 198/604, 605, 624, 456, 198/457; 271/184, 225

[56] References Cited

U.S. PATENT DOCUMENTS

| | | | |
|---|---|---|---|
| 3,166,181 | 1/1965 | Rutkus et al. | 198/457 |
| 3,701,407 | 10/1972 | Kulig | 198/457 |
| 3,900,096 | 8/1975 | Nack et al. | 198/457 |
| 5,180,154 | 1/1993 | Malick | 198/457 X |
| 5,188,355 | 2/1993 | Lowell et al. | 198/457 X |

FOREIGN PATENT DOCUMENTS

| | | | |
|---|---|---|---|
| 2743816 | 4/1979 | Fed. Rep. of Germany | 198/457 |
| 1157128 | 7/1969 | United Kingdom | 198/457 |

*Primary Examiner*—James R. Bidwell

[57] ABSTRACT

A belt transfer section for use in a right angle carton blank feeder. The belt transfer section nips the leading edge of articles leaving a feeding mechanism and moves them to another feeding mechanism operating at right angles to the first mechanism. The belt transfer section moves the articles along a diagonal path connecting the paths of movement on the other feeding mechanisms. Articles are moved by the belt transfer section at a speed greater than the speeds of the other feeding mechanisms according to the ratio of the length of the diagonal path, considered as the hypotenuse of an imaginary right triangle, to the other legs of the triangle.

5 Claims, 2 Drawing Sheets

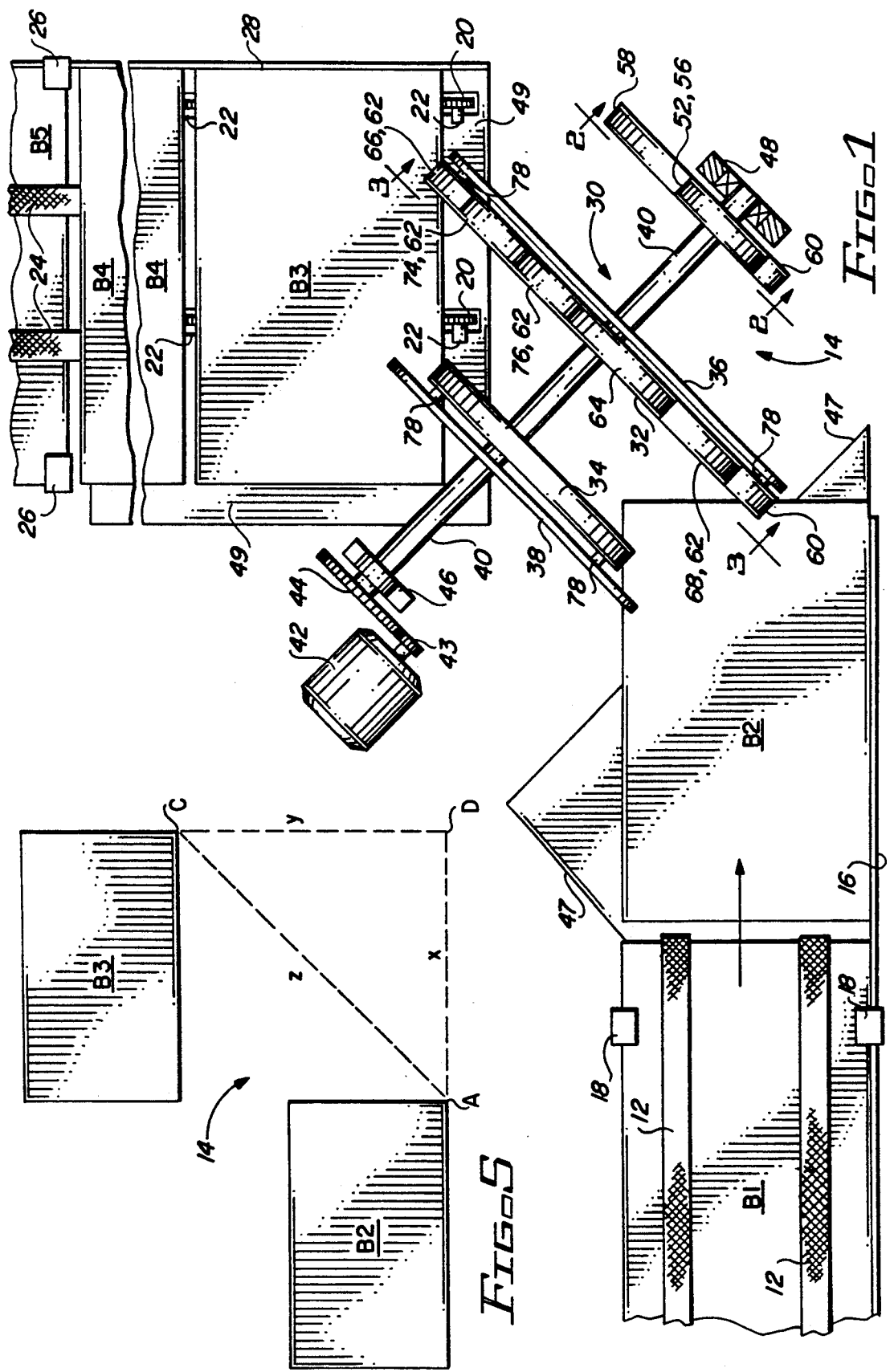

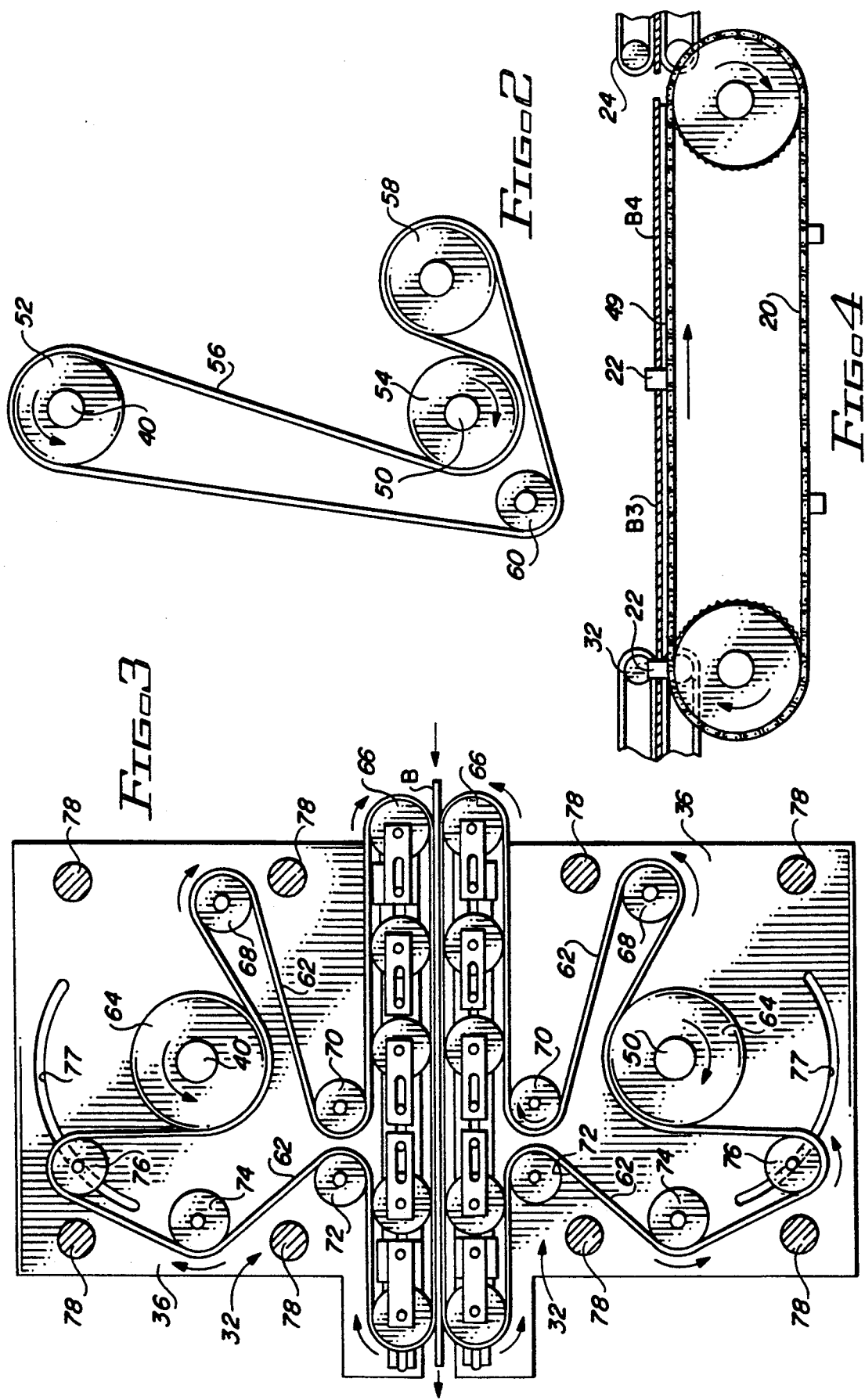

BELT TRANSFER SECTION AND METHOD OF USE FOR RIGHT ANGLE BLANK FEEDER

FIELD OF THE INVENTION

This invention relates to an article feeder for feeding articles along an angled path, such as may be encountered in a right angle gluer for carton blanks. More particularly, it relates to a transfer section for transferring articles from one leg of the angled path to the other leg.

BACKGROUND OF THE INVENTION

In fabricating cartons from flat carton blanks, a stream of blanks is commonly fed into a forming machine along a first path and glue is applied from glue applicators to edge portions of the blanks that are parallel to the direction of movement. The blanks are then moved along a second path at right angles to the first path and glue is applied from glue applicators to edge portions of the blanks that extend transversely of the first path and are now parallel to the new direction of movement. All the portions of the blanks to be glued are thus exposed to glue applicators.

A conventional way of changing the direction of movement of the blanks involves the use of speed-up rolls at the end of the first path of movement. The first feed means delivers the blanks to the speed-up rolls which accelerate them to a pocket. Moving chain lugs engage the blanks in the pocket and deliver them to the second feed means in order to move the blanks at right angles to their first direction of movement.

One of the problems noted with this conventional method of transferring blanks is that the speed-up rolls tend to wear faster than the other feeding elements, requiring expensive periodic replacement. Another problem is that the number of blanks which the machine is capable of handling per unit of time is limited by the rate at which the transfer section can transfer blanks from the first feed path to the second feed path. Because presently available transfer sections are relatively slow, it would be very beneficial to be able to transfer blanks from one path of movement to the other at a faster rate. It would also be desirable to be able to employ a transfer mechanism which does not utilize speed-up rolls, thus eliminating the problem of excessive maintenance.

It is therefore an object of the invention to provide a new means for transferring blanks or other articles from a first path of movement to a second angled path which overcomes the noted deficiencies of conventional equipment.

BRIEF SUMMARY OF THE INVENTION

In accordance with the invention, a stream of equally spaced articles is moved in a first horizontal direction at a constant speed by a first moving means and then in a second horizontal direction at an angle to the first direction by a second moving means spaced from the first moving means. The articles are transferred from the first moving means to the second moving means by moving them in a third horizontal direction directly from a point of exit on the first moving means to a point of entrance on the second moving means. The articles are moved in the third horizontal direction at a speed greater than the constant speed at which they are moved by the first and second moving means by an amount such that the spacing between the articles in the stream of articles moved by the second moving means is maintained in the stream of articles moved by the second moving means. In a right angle feeding mechanism such as is encountered in a carton blank gluing operation, the ratio of the greater speed to the speed of the first and second moving means corresponds to the ratio of the hypotenuse of a right triangle to a leg of the triangle in a manner described in detail hereinafter.

Preferably, the article moving means which effects the transfer comprises a belt assembly having upper and lower continuously moving belts for engaging upper and lower planar surfaces of the articles and which is of such proportions that only a single article is moved by the belt assembly at any one time. The belt assembly may advantageously include two parallel spaced belt assemblies in order to better stabilize the articles as they move through the transfer section. A stop surface may be provided for stopping movement of the articles as they exit the transfer mechanism and to allow the articles to be squared up for movement along the next path.

The speed of operation of the transfer mechanism is substantially more rapid than the speed of the usual speedup roll type of transfer section, and the mechanism has been found to experience much less wear. The transfer mechanism is relatively inexpensive and easy to install and is highly reliable, requiring little maintenance.

The features and benefits of the invention briefly described above, as well as other features and aspects of the invention, will readily be ascertained from the following detailed description of the preferred embodiment.

BRIEF DESCRIPTION OF THE DRAWING

FIG. 1 is a simplified plan view of the apparatus of the invention, with some structural elements omitted for the sake of clarity;

FIG. 2 is a side elevation, taken on line 2—2 of FIG. 1, of the belt arrangement for driving the lower drive shaft;

FIG. 3 is a side elevation, taken on line 3—3 of FIG. 1, of the transfer belt assemblies;

FIG. 4 is a simplified side elevation of the chain lug arrangement for moving articles after they have been deposited from the transfer belt assemblies; and FIG. 5 is a diagrammatic representation of the diagonal transfer path of travel and the relationship of that path to other dimensions of the machine.

DETAILED DESCRIPTION OF THE PREFERRED EMBODIMENT

Referring to FIG. 1, a right angle gluer incorporating the invention includes carton blank feed means, illustrated as flat belt assemblies 12, which move a continuous stream of slightly spaced carton blanks B to a transfer area 14. The machine includes an outer side guide 16 for assisting to maintain the carton blanks in proper alignment, and oppositely located glue applicators 18 of any suitable type, such as rotary drum applicators, for applying adhesive to the edge portions of the blanks that pass through the gluers. Leading away from the transfer area 14 in a direction at right angles to the direction of movement of the belt assemblies 12 are short continuous chains 20 carrying attached lugs 22. Downstream from the chains are additional flat belt assemblies 24 for moving carton blanks in the new direction past additional glue applicators 26 for applying adhesive to the edges of the blanks which previously had been aligned transverse to the direction of movement of the blanks. An outer side guide or stop plate 28 is provided along the new path of movement of the blanks.

Located in the transfer area 14 is the transfer apparatus 30 of the invention, which comprises two parallel flat belt assemblies 32 and 34 extending at a 45° angle to the paths of movement of the blanks into and out of the transfer area. The outer belt assembly 32, referred to as the front catch belt assembly, is longer than the inner belt assembly 34, referred to as the top catch belt assembly. The belt assemblies 32 and 34 are supported by mounting plates 36 and 38, respectively, and are operated from upper and lower drive shafts, the upper drive shaft 40 being the only one visible in this view. The upper drive shaft 40 is driven by any suitable drive means, shown for the purpose of illustration as comprising a motor 42 and gear 43 for driving gear 44 mounted on the shaft 40, with the shaft 40 being mounted in suitable journals, indicated at 46 and 48. A horizontal support surface or bed plate 47 is provided between the belts 12 and the belts 32 and 34 to support the blanks in the transition area between these belt assemblies. Similarly, a horizontal support surface 49 is provided between the belts 32 and 34 and the belts 24 to support the blanks in that transition area.

As shown in FIG. 2, the upper drive shaft 40 is located directly over the lower drive shaft 50, and carries a roll 52 located directly over a roll 54 mounted on the lower drive shaft. A belt 56 is trained about the upper periphery of the roll 52, the lower periphery of the roll 54 and about an adjustably mounted roll 58 and idler roll 60. With this arrangement the drive shafts are caused to rotate in opposite directions.

Referring now to FIG. 3, the front catch belt assembly 32 is comprised of two similar upper and lower belt arrangements, driven from the drive shafts 40 and 50, respectively. In the upper belt arrangement, a belt 62 is trained about a roll 64 mounted on the drive shaft 40 and about a series of adjustably mounted rollers 66, with the run on the underside of the rollers 66 engaging the upper side of a blank B. Intermediate the roll 64 and the rollers 66 the belt is trained about idle rolls 68, 70, 72, 74 and 76, with the roll 76 being adjustably mounted in slot 77 in the mounting plate 36. In this manner the rollers 66 can be adjusted to shorten or lengthen the effective length of the belt and the roller 76 can be adjusted to take up or provide more slack as needed. The lower belt arrangement contains similar elements, which have been given similar reference numerals to those used in the upper belt arrangement, but is the mirror image of the upper belt arrangement since it is driven by the oppositely rotating drive shaft drive 50. Both the upper and lower belt arrangements are adjustably mounted on support rods 78, not shown in FIG. 1, to allow the assembly to be used with various sizes and configurations of carton blanks.

The upper and lower belts of the top catch assemblies 34 are of similar construction to the belts described and are therefore not shown in detail. It will be appreciated that the invention is not limited to the particular belt assemblies described and may be carried out with any belt design capable of performing the necessary blank gripping and feeding functions.

The operation of the transfer apparatus is best described in connection with FIG. 1. The carton blank B2 is illustrated as having just entered the nip of the upper and lower front catch belts of the assembly 32 and as having just left the infeeding belt assemblies 12 after passing through the glue stations 18. The next succeeding blank B1 is shown as being still fully engaged by the belt assemblies 12. The front catch belts pull the blank B2 in the direction of the belts toward the side stop or guide plate 28. After the blank has moved a short distance, such as about ¼ inch when dealing with a conventional size carton blank, it is nipped by the upper and lower top catch belts of the assembly 34 which act to stabilize the blank through the remainder of travel through the transfer area. The downstream ends of the catch belt assemblies are located so that when the blank exits the catch belts it contacts the stop plate 28.

As shown in FIG. 4, the lugs 22 are mounted on the chains 20 at spaced intervals designed to engage the trailing edge of a blank as it is freed from the front catch belts and the top catch belts. The lugs immediately push the blank downstream until the leading edge of the blank is nipped by the belt assemblies 24, at which time the lugs begin their return run and move out of engagement with the blank. Movement of the blanks by the chain lugs while the outer edge of the blank is in contact with the stop or guide plate 28 allows the blank to be squared up to the proper position as it is presented to the belts 24. The original spacing of the blanks is maintained in this area so that it can be maintained while being moved by the belts 24. The chain lug mechanism is illustrated as pushing the spaced blanks B3 and B4 toward the belt assemblies 24.

Referring back to FIG. 1, it was stated that the front catch belt assembly and the top catch belt assembly are arranged at a 45° angle to the direction of movement of the blanks leading into and away from the transfer area 14, which causes the blanks to move through the transfer area in a similarly angled diagonal path. Because of the diagonal direction of the belts 32 and 34, they cannot operate at the speed of the belts 12 and 24. This can be better understood by referring to FIG. 5, which is a diagrammatic representation of the transfer area 14 of the apparatus.

In FIG. 5 the blank B2 is shown at the instant the front catch belts cause it to leave its incoming path of movement and begin its diagonal path of movement. The blank B3 is shown at the instant it leaves the front catch belts and engages the stop plate. The leading outside corner of the blank B2 is indicated at A. The same corner at the end of the diagonal movement of the blank is indicated at C. The path of movement of the corner is therefore along the line AC. If the original and final directions of movement of the blank corner are extended, they intersect at the point D. Thus the line AC forms the hypotenuse of the right triangle ADC. For convenience, the line AC is denoted z, the line AD is denoted x and the line CD is denoted y.

If the blank B2 were to continue to move at the same rate of speed as the incoming stream of blanks until the point A on the blank reached the point D, which is the extent of travel required of the blank until it reaches its new directional path, it would take a certain unit of time. By traveling along the diagonal path AC instead, the blank travels a greater distance than it would over the distance AD. To compensate, in accordance with the invention the speed of the blank is increased during its diagonal travel. The amount that it is must be increased has been found to bear a relationship to its original incoming speed in accordance with the ratio of the hypotenuse z to the leg x of the triangle ADC. In the case of the arrangement shown in the drawing, where the diagonal path AC represents the hypotenuse of a 45° right triangle, the distance AC is approximately 1.4 times the distance AD. Therefore, the speed of the front catch belts and the top catch belts is set at approximately 1.4 times the incoming speed. It is recognized that the hypotenuse in this case is actually slightly more than 1.4 times the distance AD, but has been rounded off to 1.4 since as a practical matter the speed settings of the belts cannot be adjusted finer than that. The pick-up of the blanks by the lugs 22 and their movement to the belts 24 can also be adjusted in order to compensate for any slight differences that may exist between the actual speed of the belts 32 and 34 and the theoretical speed of diagonal movement. The speed of the belts 24 which move the blanks downstream after being transferred remains the same as the incoming speed in order to maintain a steady flow of evenly spaced blanks through the machine.

It is not necessary to move the blanks through the transfer area at a 45° angle. Any other convenient angle may be employed, with the method of determining the appropriate speed of the belts 32 and 34 remaining the same. For example, to make a right angle turn at any desired diagonal angle, the ratio of the diagonal path to the path AD is determined by solving the equation z=the square root of the sum of $x^2+y^2$, and then setting the speed of the diagonal belts at approximately the ratio of z to x.

It has been found that a machine as described is capable of increasing the speed of moving carton blanks though a right angle gluer by a very substantial amount, up to about 50% greater than the conventional means referred to above. Since the invention has the added benefits of being economical to fabricate and install, being easy to maintain and not being susceptible to wearing out prematurely as in the case of the conventional system, it is clearly an improvement over the conventional means.

While the invention has been described primarily in connection with a transfer section of a right angle gluing machine employed in the fabrication of a carton from a blank, it will be recognized that it could find utility in any article feeding arrangement that incorporates an angled feed path. Although the use of belt transfer means requires the articles to have planar faces, the periphery of the articles is not limited to any particular shape. Thus the rectangular shape of the blanks illustrated in the drawing is intended to be merely representative. It will be appreciated that other operations which normally would be carried out in a carton fabricating machine, such as folding steps, are not affected by the particular transfer means employed and so have not been illustrated.

While two different mechanisms, chain-driven lugs and belt assemblies, have been described as being serially used in the preferred embodiment to impart downstream movement to the blanks after leaving the transfer area, it may be possible to employ a single moving means. As such, the term "second moving means" in the claims is intended to refer singly or collectively to one or both of the moving means unless a different meaning is clearly assigned.

Although a specific right angle transfer section has been described, it is contemplated that changes to certain features and aspects of the transfer section which do not affect the overall basic function and concept of the invention may be made by those skilled in the art without departing from the spirit and scope of the invention, as defined in the appended claims.

What is claimed is:

1. A machine for continuously moving a stream of articles along an angled path, comprising:
    first article moving means for moving a stream of equally spaced articles in a first horizontal direction at a constant speed;
    second article moving means spaced from the first article moving means for moving a stream of equally spaced articles in a second horizontal direction at an angle to the first direction at said constant speed;
    third article moving means between the first and second moving means for moving the articles directly from a point of exit on the first moving means to a point of entrance on the second moving means; and
    the third article moving means moving the articles at a speed greater than said constant speed by an amount such that the spacing between the articles in the stream of articles moved by the second moving means is substantially the same as the spacing between articles in the stream of articles moved by the first moving means;
    the third article moving means comprising two parallel belt assemblies including upper and lower continuously moving belts for engaging upper and lower planar surfaces, respectively, of the articles, one of the belt assemblies being outwardly spaced from the other belt assembly and being arranged to movingly engage an article on the first moving means shortly before said other belt assembly engages the article.

2. A machine for continuously moving a stream of substantially planar rigid articles along an angled path, comprising:
    first article moving means for moving a stream of equally spaced articles in a first horizontal direction at a constant speed;
    second article moving means spaced from the first article moving means for moving a stream of equally spaced articles in a second horizontal direction at an angle to the first direction at said constant speed;
    third article moving means between the first and second moving means for moving the articles directly from a point of exit on the first moving means to a point of entrance on the second moving means;
    the second article moving means including a first section comprised of spaced continuously moving lugs adapted to engage the trailing edge of an article upon the article exiting the third article moving means;
    a side stop for stopping movement of an article as the article exits the third moving means just prior to being engaged by the lugs; and
    the third article moving means moving the articles at a speed greater than said constant speed by an amount such that the spacing between the articles in the stream of articles moved by the second moving means is substantially the same as the spacing between articles in the stream of articles moved by the first moving means.

3. A machine for continuously moving a stream of articles according to claim 2, wherein the first article moving means is comprised of at least one belt assembly including upper and lower continuously moving belts, the second article moving means has a second section comprised of at least one belt assembly including upper and lower continuously moving belts, the second section being arranged to movingly engage an article as the article exits the first section of the second article moving means, and the third article moving means comprises a belt assembly including upper and lower continuously moving belts for engaging upper and lower planar surfaces, respectively, of the articles.

4. A method of continuously moving a stream of articles along an angled path, comprising:

moving a stream of equally spaced articles in a first horizontal direction at a constant speed by a first moving means;

moving the stream of articles at said constant speed in a second horizontal direction at an angle to the first direction by a second moving means spaced from the first moving means;

transferring the articles from the first moving means to the second moving means by moving the articles in a third horizontal direction direly from a point of exit on the first moving means to a point of entrance on the second moving means;

the articles being moved in the third horizontal direction at a speed greater than said constant speed by an amount such that the spacing between the articles in the stream of articles moved by the second moving means is maintained in the stream of articles moved by the second moving means; and the first and second article moving means being spaced apart so that only a single article is moved by the third article moving means at any one time, the first and second horizontal directions are at right angles to each other and the articles are transferred by the third moving means at a speed which is related to the speed of the first and second article moving means in accordance with the equation $z=$ the square root of the sum of $x^2+y^2$, where x is one leg of a right triangle equal to the distance from the point of exit on the first moving means to the point at which an extension of the original path of movement of an article moved by the first moving means intersects an extension of the point of entrance of the path of movement of an article moved by the second moving means, y is a second leg of the right triangle equal to the distance from the point of entrance of the second moving means to the aforesaid intersection point and z is the hypotenuse of the right triangle, the speed of the third article moving means being approximately the ratio of Z to X.

5. A method of continuously moving a stream of articles according to claim 4, wherein the angle between the hypotenuse and the legs of the right triangle is 45°.

* * * * *